US006676259B1

United States Patent
Trifilo (10) Patent No.: US 6,676,259 B1
(45) Date of Patent: Jan. 13, 2004

(54) STEREOGRAPHIC DISPLAY DEVICE (75) Inventor: Timothy M. Trifilo, Walden, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 10/176,902

(22) Filed: Jun. 21, 2002

(51) Int. Cl.$^7$ .................. H04N 13/00; G03B 21/00
(52) U.S. Cl. ..................... 353/20; 353/7; 359/464
(58) Field of Search ................ 353/7.8, 10, 20; 359/462, 464, 465, 466, 472, 475, 478; 349/15; 348/51, 55, 57, 58

(56) References Cited

U.S. PATENT DOCUMENTS

| | | | |
|---|---|---|---|
| 542,321 A | 7/1895 | Anderton | |
| 3,737,567 A | 6/1973 | Kratomi | 178/6.5 |
| 4,326,772 A | 4/1982 | Hausherr | 350/134 |
| 4,719,507 A | * 1/1988 | Bos | 348/57 |
| 4,792,850 A | * 12/1988 | Liptoh et al. | 348/57 |
| 4,807,965 A | 2/1989 | Garakani | 350/131 |
| 4,853,769 A | 8/1989 | Kollin | 358/88 |
| 4,877,307 A | * 10/1989 | Kalmanash | 359/465 |
| 4,884,876 A | 12/1989 | Lipton et al. | 350/347 E |
| 4,967,268 A | 10/1990 | Lipton et al. | 358/92 |
| 4,995,718 A | * 2/1991 | Jachimowicz et al. | 353/31 |
| 5,002,387 A | 3/1991 | Baljet et al. | 352/63 |
| 5,348,477 A | 9/1994 | Welch et al. | 434/43 |
| 5,537,144 A | 7/1996 | Faris | 348/58 |
| 5,539,423 A | 7/1996 | Kim et al. | 345/8 |
| 5,564,810 A | * 10/1996 | Larson | 353/8 |
| 5,808,802 A | 9/1998 | Hur | 359/630 |
| 6,002,518 A | * 12/1999 | Faris | 359/465 |

FOREIGN PATENT DOCUMENTS

WO    WO 94/21086    9/1994

* cited by examiner

*Primary Examiner*—William Dowling
(74) *Attorney, Agent, or Firm*—Floyd A. Gonzalez; Cantor Colburn LLP (57) ABSTRACT A stereographic display system comprises a signal processing unit receptive of stereographic images originating from stereographic image sources at a prescribed frame rate. The stereographic display system is operative to generate a multiplexed image stream and a series of synchronization pulses. An image display device is receptive of the multiplexed image stream and operative to display the multiplexed image stream as multiplexed images. A phase-locked loop is receptive of the series of synchronization pulses from the signal processing unit. An optical signal filter system is coupled to the phase-locked loop and receptive of the multiplexed stereographic images. The optical signal filter system includes rotating polarization filters that alternately pass or block the passage of a first and second image of the multiplexed stereographic images. The stereographic display system may be made, in whole or in part, an integral part of an item of apparel such as a pair of glasses or a helmet.

33 Claims, 11 Drawing Sheets

STEREOGRAPHIC DISPLAY DEVICE

TECHNICAL FIELD

This invention relates to stereographic display devices and more particularly to such devices as an integral part of an item of apparel such as a pair of glasses or a helmet.

BACKGROUND OF THE INVENTION

In current technology for head mounted display (HMD) devices a single display device is used for each eye of the viewer. This is costly because it requires not only a second display device but also additional drive electonics. One solution is to use a single display device and liquid crystal optical shutters to route the images to the appropriate eye. This however is limited by the relatively slow shutter speeds of from about 10 msec to 50 msec which can be further slowed at low temperatures, causing flicker.

SUMMARY OF THE INVENTION

A stereographic display system comprises a signal processing unit receptive of stereo images originating from stereo image sources at a prescribed frame rate. The stereographic display system is operative to generate a multiplexed image stream and a series of synchronization pulses. An image display device is receptive of the multiplexed image stream and operative to display the multiplexed image stream as multiplexed stereo images. A phase-locked loop is receptive of the series of synchronization pulses from the signal processing unit. An optical signal filter system is coupled to the phase-locked loop and receptive of the multiplexed stereo images. The optical signal filter system includes rotating polarization filters that alternately pass or block the passage of a first and second image of the multiplexed stereo images.

The stereographic display system may be made, in whole or in part, an integral part of an item of apparel such as a pair of glasses or a helmet or headdress.

DETAILED DESCRIPTION OF THE INVENTION

Figure 1:
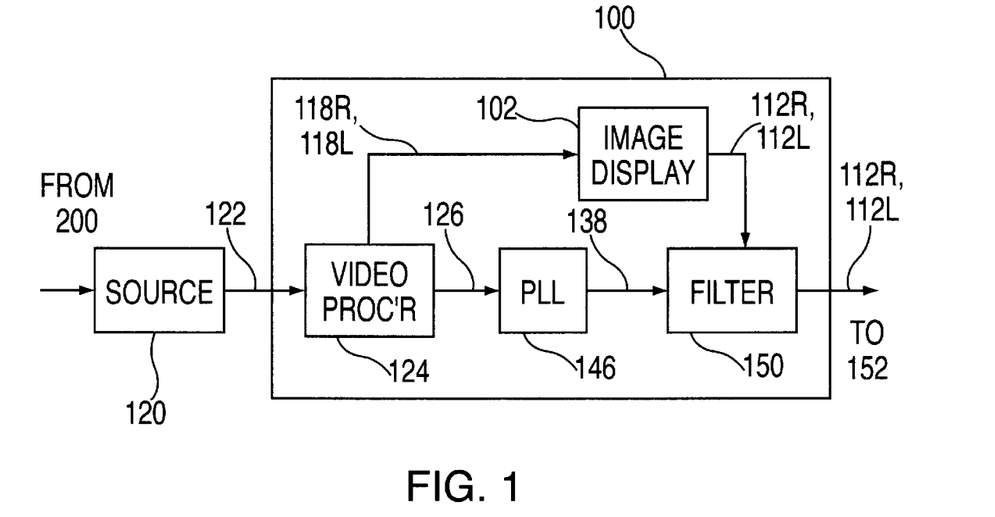
FIG. 1 is a schematic block diagram of a stereographic display system receptive of stereographic images.

In FIG. 1, a stereographic display system is shown generally at 100. The stereographic display system 100 is receptive of stereographic images or data 122 at a frame rate, $f_r$, originating from stereographic image or data sources 120 such as personal computers, video cameras, game consoles, video discs or other stereographic devices which can act as a source of stereographic images or data. A signal or data processing unit, such as a video processor 124, which includes a synchronization extractor or calculator, receives the stereographic images or data 122 and generates thereby a set of output signals 118R, 118L, 126. As best understood, the term stereographic is synonymous with the term stereoscopic. A first video processor output signal 118R, 118L comprises an electronic signal in the nature of a multiplexed image or data stream. The multiplexed image or data stream 118R, 118L may be for example left and right images which are directed to an image or data display device 102 such as a cathode ray tube display (CRT). The image or data display device 102 provides as output an optical signal 112R, 112L in the nature of a set of left and right stereographic images or data. The left and right stereographic images 112R, 112L are directed to a multiplexing optical filter system 150. The multiplexing optical filter system 150 comprises a set of rotatable filters 104, 106, 108 which, in combination, alternately pass and block the stereographic images or data 112R, 112L. A second video processor output signal 126 comprises a series of synchronization pulses for synchronizing the rotational velocities, $\omega_C, \omega_R, \omega_L$ of the set of filters 104, 106, 108 rotated by a motor 136 (not shown in FIG. 1, but to be explained more fully below). The synchronization pulse rate, $f_p$, is an integer multiple of the frame rate, e.g., $f_p=nf_r$. A phase-locked loop (PLL) 146 is receptive of the second video processor output signal 126 and operative thereby to rotate 138 the set of filters 104, 106, 108 at the aforesaid rotational velocities $\omega_C, \omega_R, \omega_L$. Since the filters 104, 106, 108 are coupled to the motor 136, the rotational velocities, $\omega_C, \omega_R, \omega_L$, thereof are directly related to the motor rotational velocity, $\omega_M$.

Figure 2:
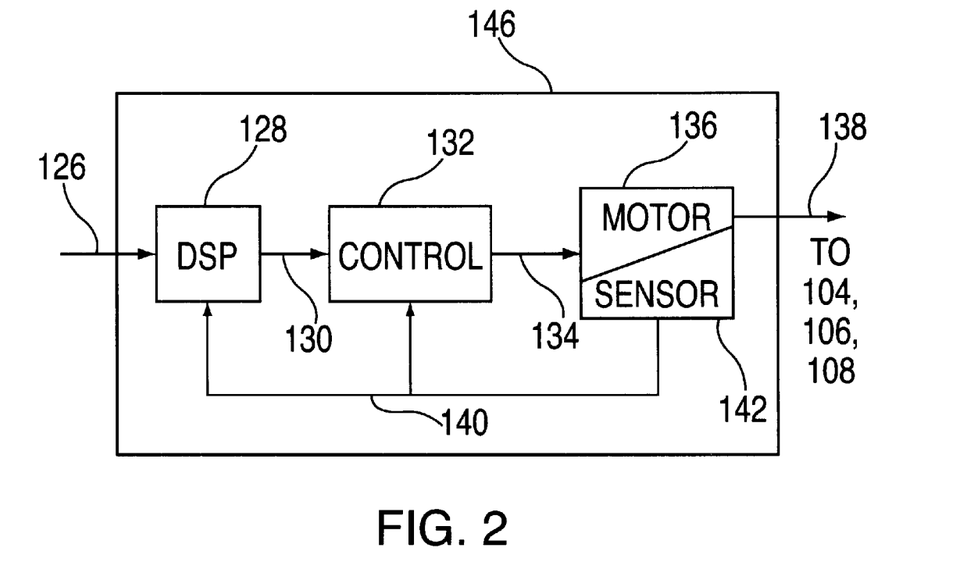
FIG. 2 is a schematic block diagram of a phase locked loop in the stereographic display system of FIG. 1.

FIG. 2 shows a schematic block diagram of the phase-locked loop 146 of FIG. 1. The phase-locked loop 146 comprises a digital signal processing (DSP) unit or microprocessor 128 receptive of the synchronization pulses of the second video processor output signal 126 and calculates a desired motor rotational velocity, $\omega_M$, and motor (or filter) phase, $\phi_M$, for any given frame rate, $f_r$. The digital signal processing unit or microprocessor 128 provides as output a motor speed command signal 130. A controller 132 is receptive of the motor speed command signal 130 and provides as output a motor drive signal 134 which is directed to the motor 136. The motor 136 thereby rotates 138 the set of filters 104, 106, 108 which are receptive of stereographic images or data 112R, 112L from the image or data display device 102. The motor 136 includes a sensor 142 for sensing the motor rotational velocity, $\omega_M$. The sensed motor rotational velocity, $\omega_S$, is fed back to the controller 132 and to the digital signal processing unit or microprocessor 128 as a set of pulses 140 for synchronization with the synchronization pulses of the second video processor output signal 126.

Figure 3:
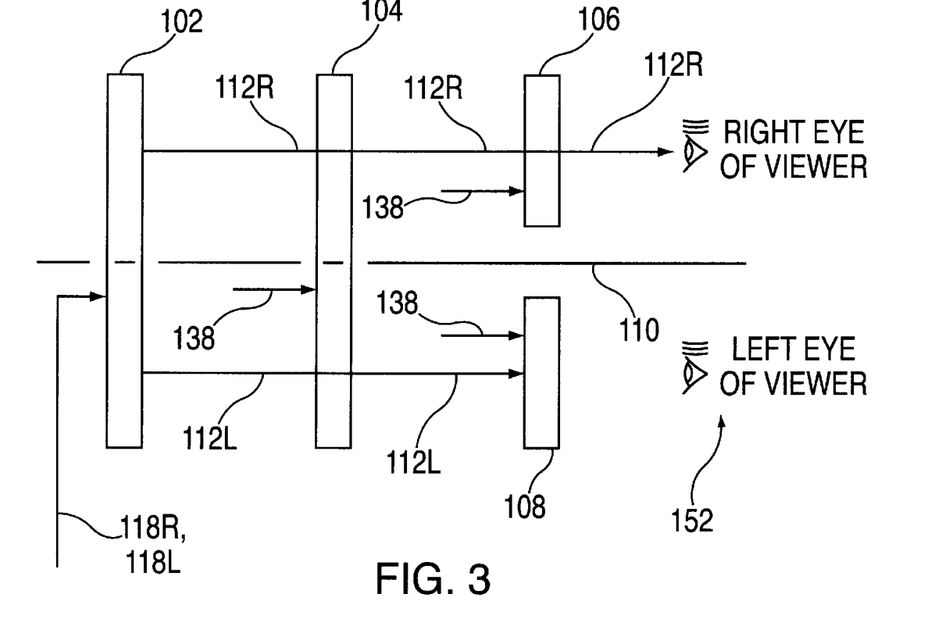
FIG. 3 is a first schematic diagram of the arrangement of polarizing filters in the stereographic display device of FIG. 1 passing a first beam of polarized light.
Figure 4:
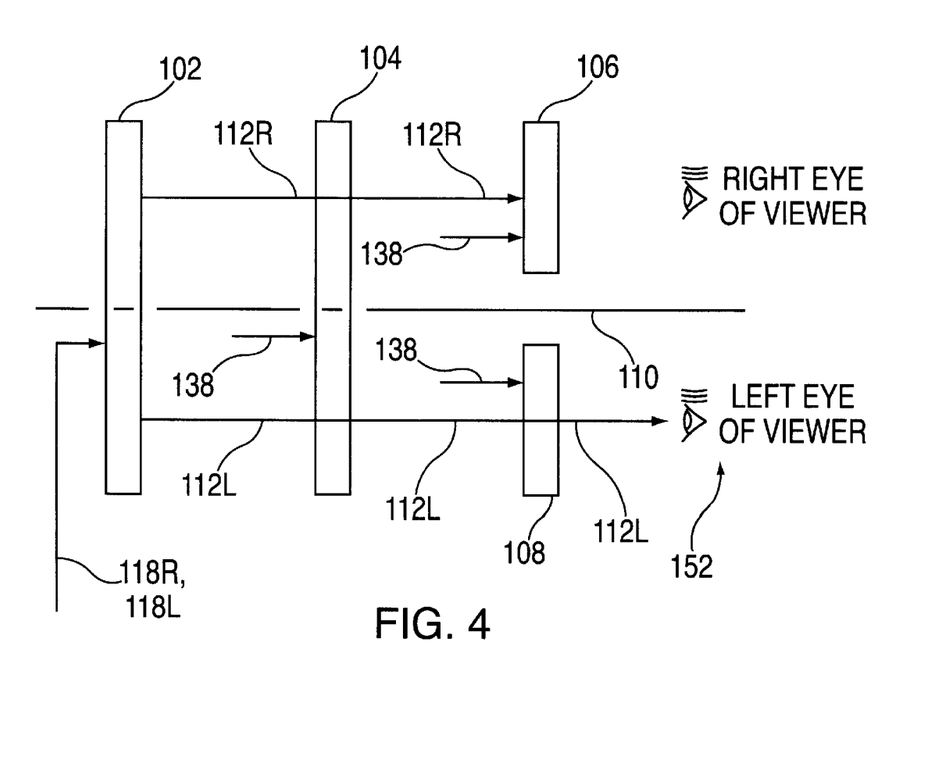
FIG. 4 is a second schematic diagram of the arrangement of polarizing filters in the stereographic device of FIG. 1 passing a second beam of polarized light.
Figure 5:
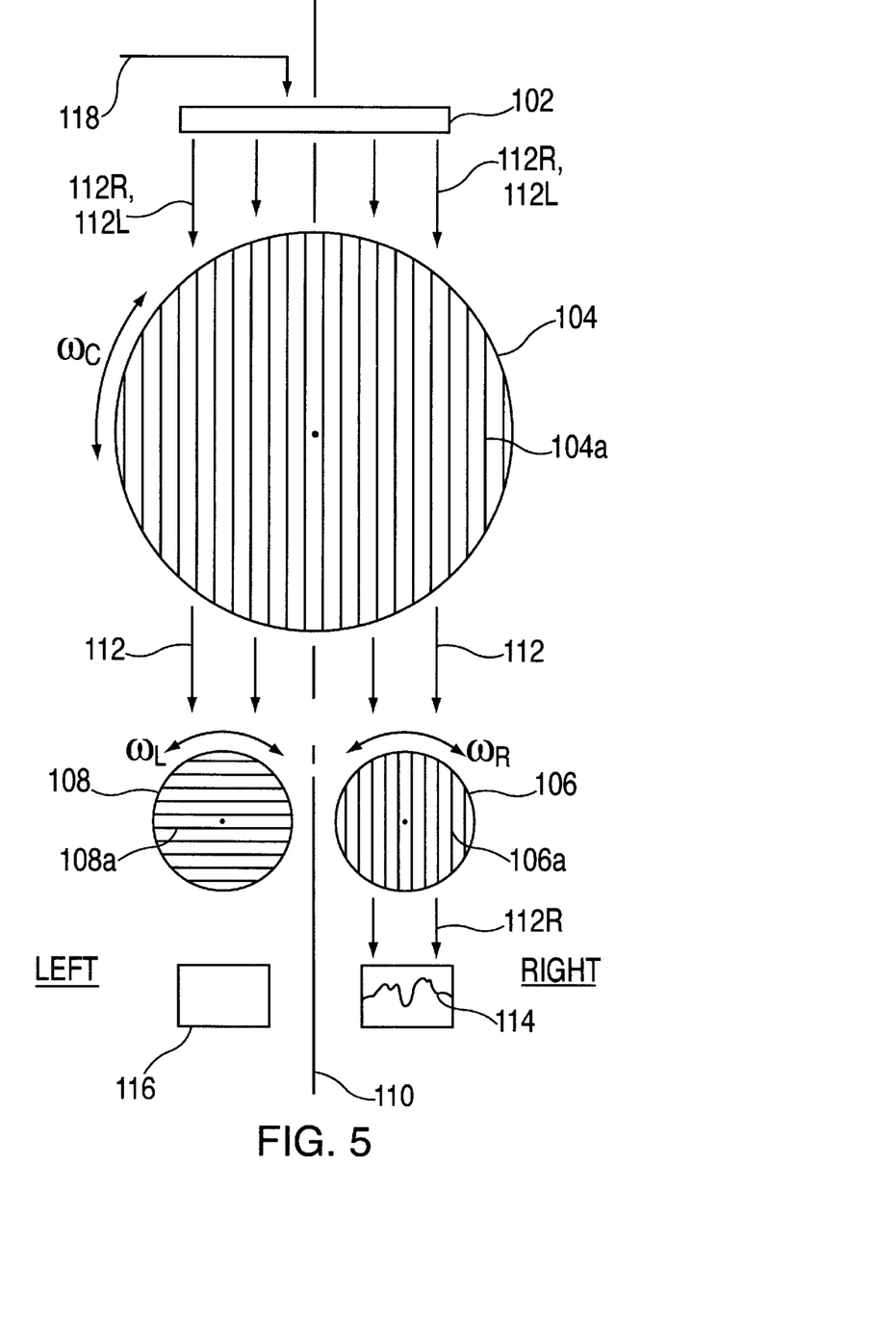
FIG. 5 is a second schematic diagram of the stereographic display device of FIG. 2 passing the first beam of light.

Reference is now made to FIGS. 3, 4, 5, 6, 12 and 13 which should be viewed in conjunction with one another. In FIGS. 3 and 5 the image or data display device 102 and the filters 104, 106, 108 are shown positioned with respect to one another receiving the stereographic images or data 112R, 112L and also with respect to an axis 110. The filters 104, 106, 108 are polarization filters, each having a transmission axis 104a, 106a, 108a such that light, polarized parallel to the transmission axis passes therethrough, and light polarized perpendicular to the transmission axis is blocked from passing therethrough. As such, in FIG. 5, the stereographic images or data 112R, 112L, polarized parallel to the transmission axis 104a of the first filter 104, pass through the first filter 104 and further pass through the second filter 106 when the transmission axis 106a of the second filter 106 is parallel to the transmission axis 104a of the first 104. However, the stereographic images or data 112R, 112L will not pass through the third filter 108 when the transmission axis 108a of the third filter 108 is perpendicular to the transmission axis 104a of the first filter 104. Thus, the viewer 152 perceives the stereographic images or data 112R in his/her right eye at 114 but does not perceive the stereographic images or data 112R in his/her left eye at 116.

Figure 6:
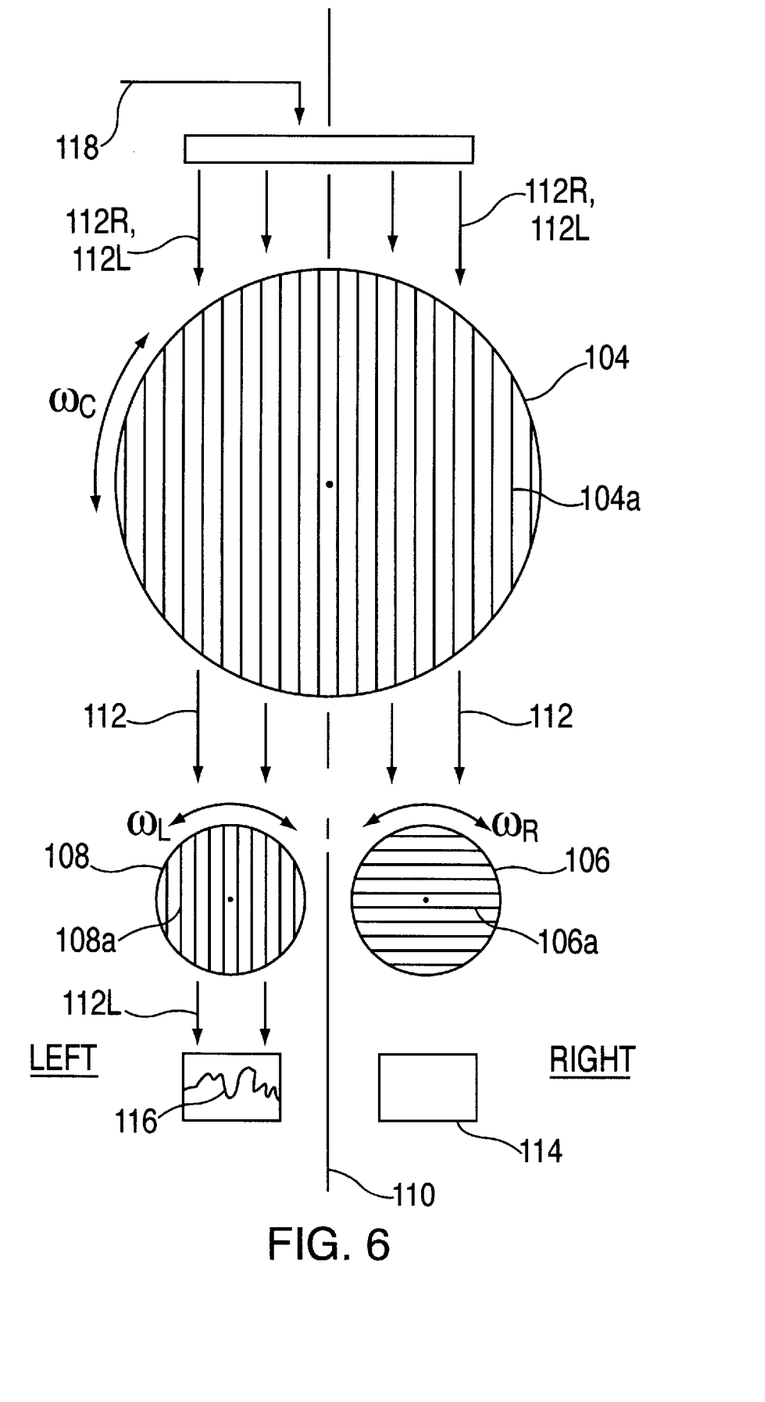
FIG. 6 is a second schematic diagram of the stereographic display device of FIG. 3 passing the second beam of light.

Conversely, in FIGS. 4 and 6 the image or data display device 102 and the filters 104, 106, 108 are again shown positioned with respect to one another receiving the stereographic images or data 112R, 112L and also with respect to the axis 110. As such, in FIG. 6, the stereographic images or data 112R, 112L, polarized parallel to the transmission axis 104a of the first filter 104, pass through the first filter 104 and further pass through the third filter 108 when the transmission axis 108a of the third filter 108 is parallel to the transmission axis 104a of the first filter 104. However, the stereographic images or data 112R, 112L will not pass through the second filter 106 when the transmission axis 106a of the second filter 106 is perpendicular to the transmission axis 104a of the first filter 104. Thus, the viewer 152 perceives the stereographic images or data 112L in his/her left eye at 116 but does not perceive the stereographic images or data 112L in his/her right eye at 114.

In FIGS. 5 and 6 it is seen that the second filter 106 and third filter 108 rotate either in a clockwise or a counterclockwise direction at an angular velocity of $\omega_R$ and $\omega_L$ respectively (e.g., approximately $120\pi$ radians per sec or greater.). It is also seen that the transmission axes 106a, 108a of the second and third filters 106, 108 are at right angles with respect to one another (i.e., 90 degrees out of phase). Thus, as the second and third filters 106, 108 rotate at $\omega_R$ and $\omega_L$, the viewer 152 alternately perceives aright stereographic image or data 112R and left stereographic image or data 112L version of the stereographic images or data stream 118R and 118L through the multiplexing filters 104, 106, 108 at 114 and 116 at the frame rate $f_r$; or at one half of the frame rate for each eye. The second and third filters 106, 108 may rotate in the same direction or in opposite directions and are synchronized to be rotated by the same motor 136. The first filter 104 may be stationary or alternatively may also rotate either clockwise or counterclockwise at $\omega_C$. When the first filter 104 is rotated, the rotation rates of the second and third filters, $\omega_R$ and $\omega_L$, 106, 108 are adjusted so as to maintain the alternate perception of the stereographic images or data 112R, 112L by the viewer 152 at the aforesaid frame rates. Thus, when the first filter 104 is rotated, $\omega_C = 2n\omega_R$ or $2n\omega_L$, where n is an integer. It will thus be understood that FIGS. 5 and 6 represent a "snapshot" of the stereographic display system 100 as the second and third filters 106, 108 rotate.

Figure 12:
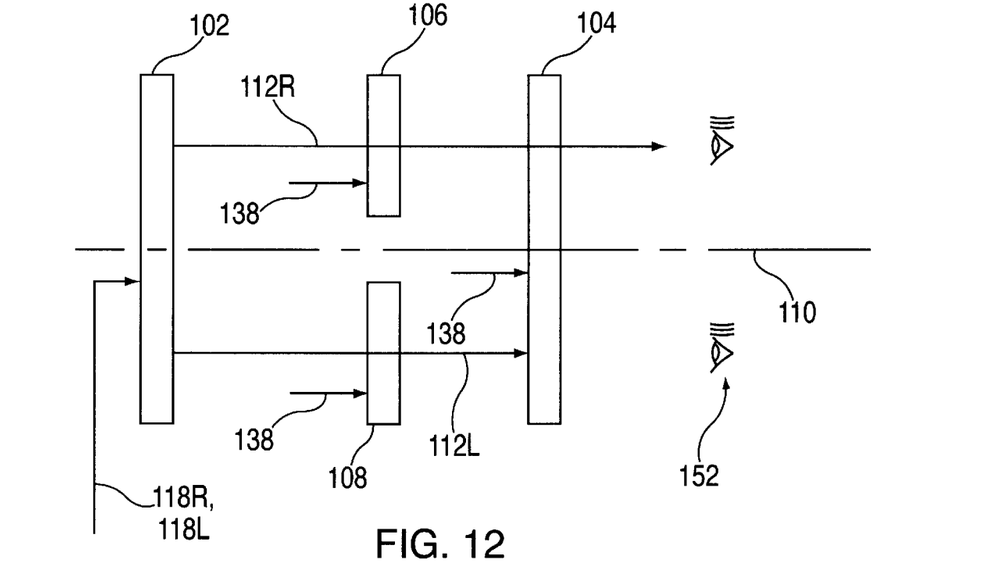
FIG. 12 is a third schematic diagram of the arrangement of polarizing filters in the stereographic display device of FIG. 1 passing a first beam of polarized light.
Figure 13:
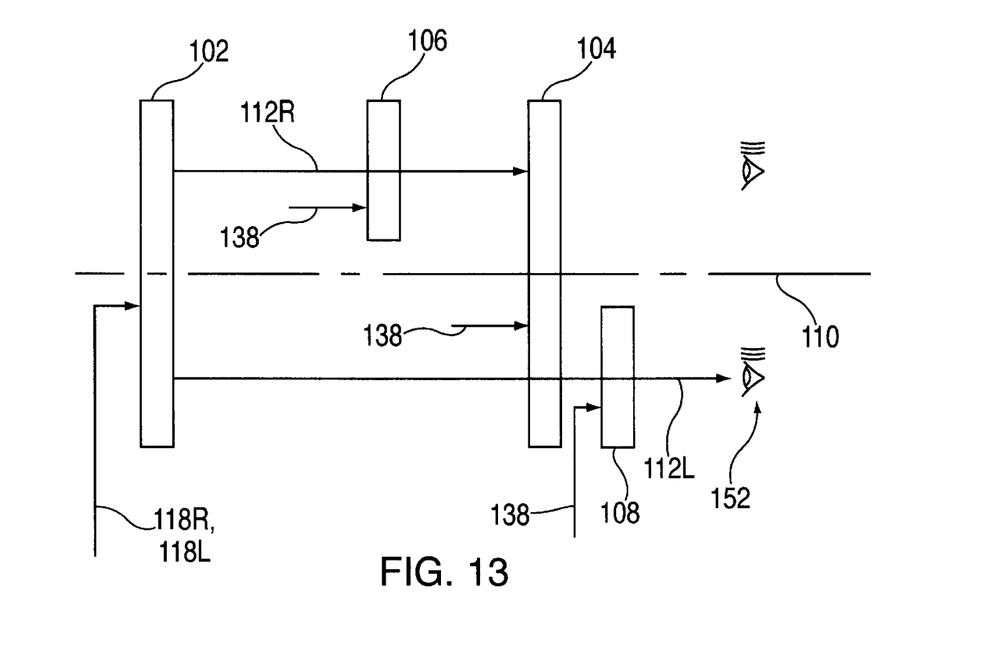
FIG. 13 is a fourth schematic diagram of the arrangement of polarizing filters in the stereographic display device of FIG. 1 passing a first beam of polarized light.

It will also be understood from FIGS. 3, 4, 5, 6, 12 and 13 that the order in which the filters 104, 106, 108 are positioned with respect to the reception of the stereographic images or data 112R, 112L is immaterial. In other words, filters 106, 108 can be positioned, either in combination or separately, so as to receive the stereographic images or data 112R, 112L prior to the reception thereof by filter 104 (FIGS. 12 and 13).

Figure 7:
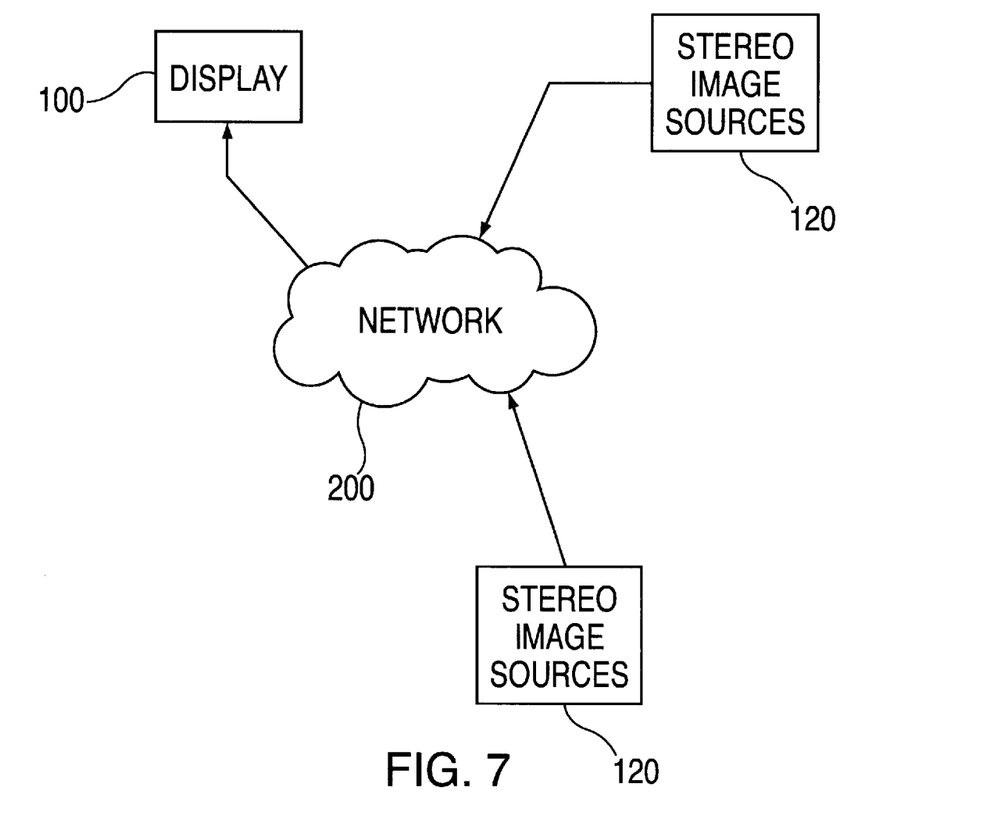
FIG. 7 is a schematic diagram of the stereographic display system of FIG. 1 in communication with remote stereographic display devices via a communications or computer network.

Referring to FIG. 7, the stereographic display system 100 is shown connected to a communications network 200, such as a local area network (LAN) or a wide area network (WAN) or the internet. The communications network 200 includes a plurality of stereographic images or data sources 120 such as personal computers, video cameras, game consoles video discs or other stereographic video devices connected thereto from remote geographical locations by wired or wireless connections, by radio based communications, by telephony based communications, or by other network-based communications. The stereographic display system 100 may also be connected directly to other like stereographic display systems 100 for displaying the image or data source 120. The communications network 200 may be similarly connected to other networks and includes network devices configured to execute program software, that allows them to send, receive, store, record and process images either separately or in combination, between and amongst themselves via the network 200. Such processing includes, for example, computer generated holography, image compression and decompression, filtering, contrast enhancement, image sharpening, noise removal and correlation for image classification.

Figure 8:
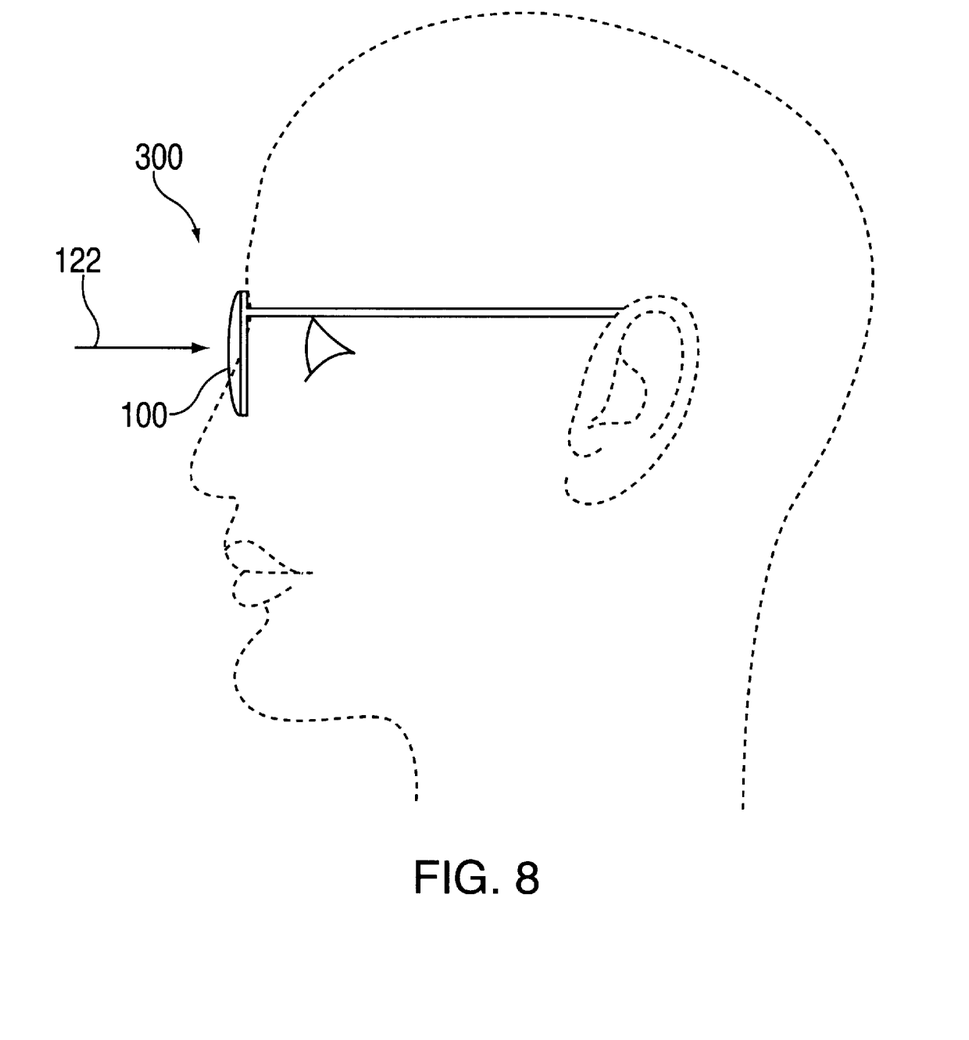
FIG. 8 is a view of the stereographic display system of FIG. 1 integrally mounted on an article of apparel such as viewing glasses.
Figure 9:
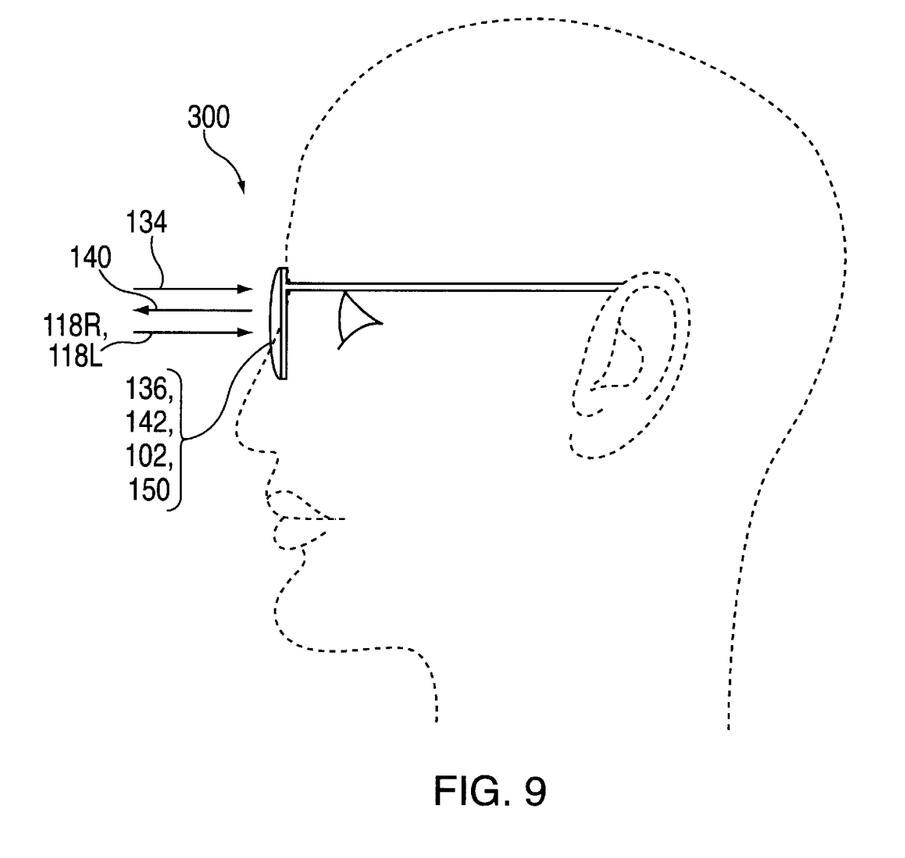
FIG. 9 is a view of the a segment of the stereographic display system of FIG. 1 integrally mounted in an article of apparel such as viewing glasses.
Figure 10:
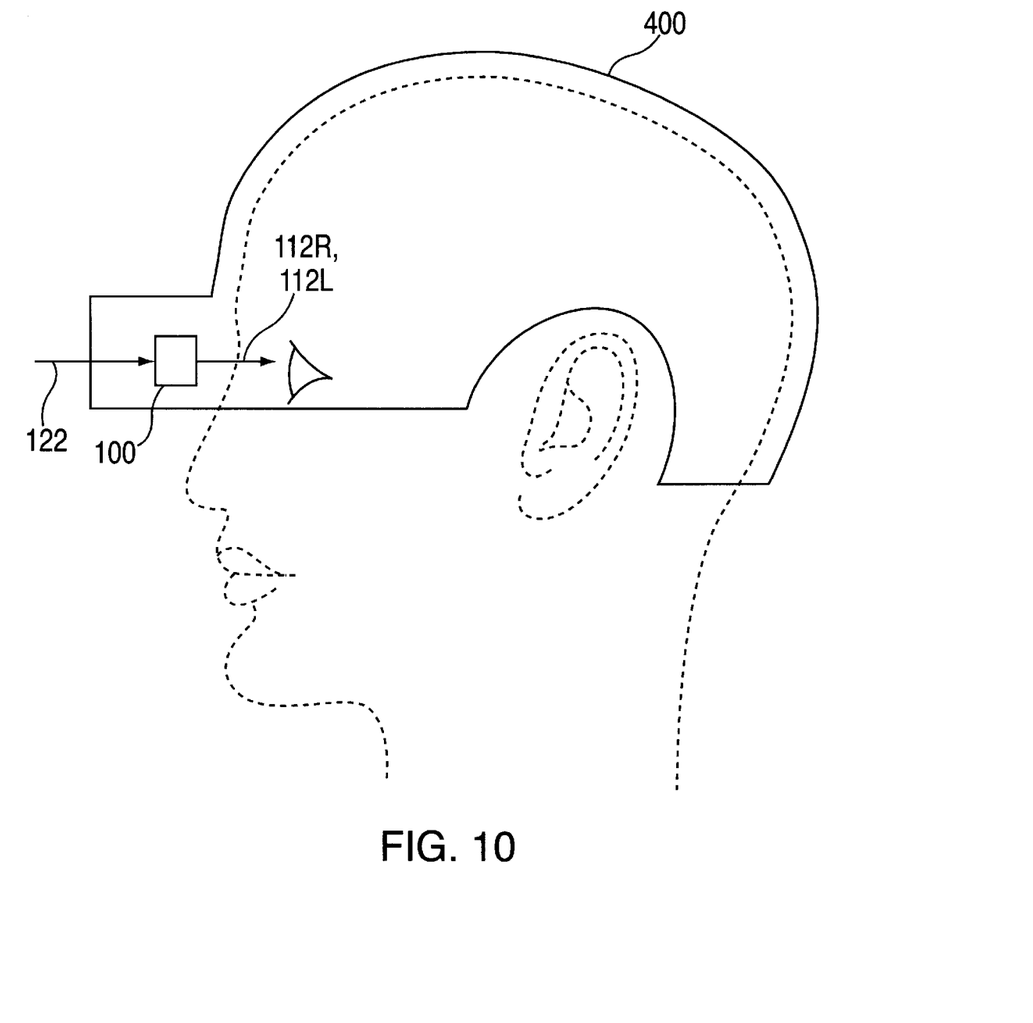
FIG. 10 is a view of the stereographic display system of FIG. 1 integrally mounted in an article of apparel such as a helmet or headdress.
Figure 11:
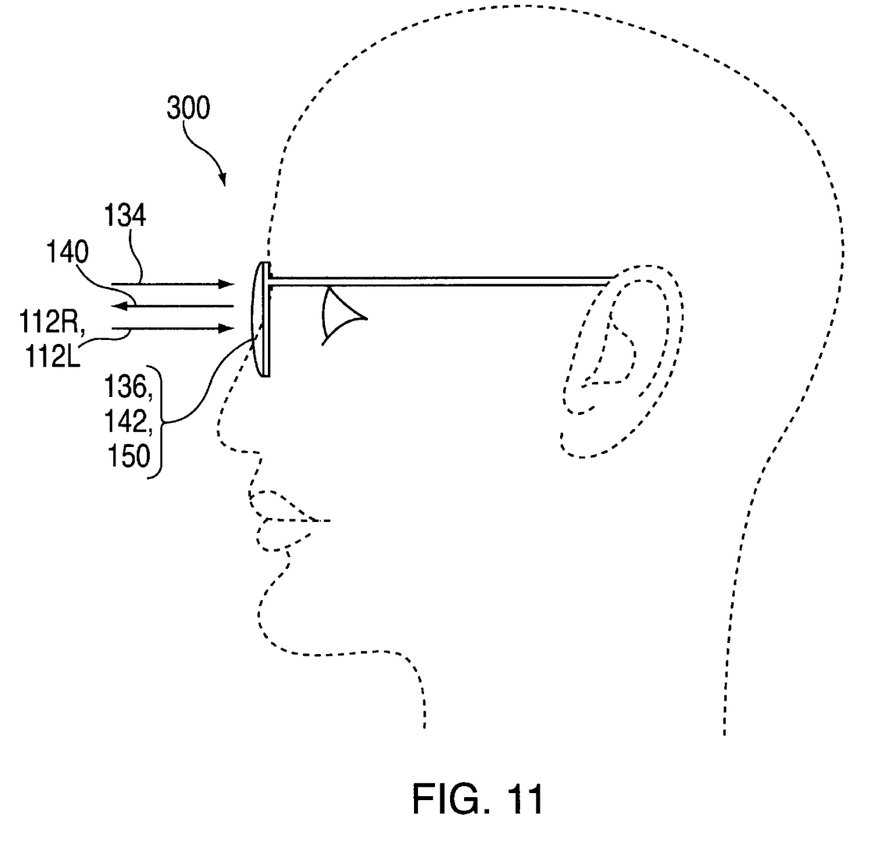
FIG. 11 is a view of the a segment of the stereographic display system of FIG. 1 integrally mounted in an article of apparel such as viewing glasses.

Referring to FIGS. 8, 9, 10 and 11, it will be seen that the stereographic display system 100 of FIG. 1 may be made, in whole or in part, an integral part of an item of apparel such as a pair of glasses 300 or a helmet or headdress 400. In FIG. 8 the stereographic display system 100 is mounted on the pair of glasses 300, viewable therefrom and receptive of the stereographic images or data 122. In FIG. 9, the motor, sensor combination 136, 142, the image display device 102 and the multiplexing optical filter system 150 are made an integral part of the pair of glasses 300 and receive the multiplexed image or data stream 118R, 118L, the motor drive signal 134 and provide the set of feedback pulses 140. In FIG. 10 a helmet or headdress 400 contains the stereographic display system 100 and is worn by a viewer about the head and viewable therefrom. In FIG. 11, the motor, sensor combination 136, 142 and the multiplexing optical filter system 150 are made an integral part of the pair of glasses 300 and receive the stereographic images or data 112R, 112L, the motor drive signal 134 and provide the set of feedback pulses 140.

What is claimed is:

1. A display device comprising:
    a display device for displaying multiplexed images;
    a first polarizing filter having a first transmission axis, the first polarizing filter receptive of the multiplexed images from the display device and operative thereby to pass the received multiplexed images therethrough;

a second polarizing filter having a second transmission axis rotated at a first prescribe angle with respect to the transmission axis of the first filter, the second polarizing filter receptive of the multiplexed images from the first filter and operative thereby to pass a first segment of the multiplexed images therethrough; and a third polarizing filter having a third transmission axis rotated at a second prescribe angle with respect to the transmission axis of the second filter, the third polarizing filter receptive of the multiplexed images from the first filter, and operative thereby to pass a second segment of the multiplexed images therethrough;

wherein the second and third filters rotate at a prescribed angular velocity with respect to the first filter.

2. The display device as set forth in claim 1 wherein the first filter is stationary.

3. The display device as set forth in claim 1 wherein the first prescribed angle is zero degrees.

4. The display device as set forth in claim 1 wherein the first and second polarizing filters are positioned at right angles with respect to an optical axis passing through the display device.

5. The display device as set forth in claim 1 wherein the second prescribed angle is ninety degrees.

6. The display device as set forth in claim 1 wherein the prescribed angular velocity is approximately $120\pi$ radians per sec or greater.

7. A display device comprising:

a display device for displaying multiplexed images;

a first polarizing filter having a first transmission axis, the first polarizing filter receptive of the multiplexed images from the display device and operative thereby to pass the received multiplexed images therethrough;

a second polarizing filter having a second transmission axis rotated at a first prescribe angle with respect to the transmission axis of the first filter, the second polarizing filter receptive of the multiplexed images from the first filter, and operative thereby to pass a first segment of the multiplexed images therethrough; and a third polarizing filter having a third transmission axis rotated at a second prescribe angle with respect to the transmission axis of the second filter, the third polarizing filter receptive of the multiplexed images from the first filter and operative thereby to pass a second segment of the multiplexed images therethrough;

a motor coupled to the second and third polarizing filters for rotating the second and third polarizing filters.

8. An optical filter system comprising:

a first polarizing filter having a first transmission axis, the first polarizing filter receptive of a multiplexed image from a display device and operative thereby to pass the received multiplexed image therethrough;

a second polarizing filter having a second transmission axis rotated at a first prescribe angle with respect to the transmission axis of the first filter, the second polarizing filter receptive of the multiplexed image from the first polarizing filter, and a third polarizing filter having a third transmission axis rotated at a second prescribe angle with respect to the transmission axis of the second filter, the third polarizing filter receptive of the multiplexed image from the first polarizing filter;

wherein the second and third polarizing filters rotate at a prescribed angular velocity with respect to the first polarizing filter.

9. The filter system as set forth in claim 8 wherein the first polarizing filter is stationary.

10. The filter system as set forth in claim 8 wherein the first, second and third polarizing filters are polarizers.

11. The filter system as set forth in claim 8 wherein the first and second polarizing filters are positioned at right angles with respect to an optical axis passing through the display device.

12. The filter system as set forth in claim 8 wherein the second prescribed angle is ninety degrees.

13. The filter system as set forth in claim 8 wherein the prescribed angular velocity is approximately $120\pi$ radians per sec or greater.

14. An optical filter system comprising:

a first polarizing filter having a first transmission axis, the first polarizing filter receptive of a multiplexed image from a display device and operative thereby to pass the received multiplexed imager therethrough;

a second polarizing filter having a second transmission axis rotated at a first prescribe angle with respect to the transmission axis of the first filter, the second polarizing filter receptive of the multiplexed image from the first polarizing filter; and a third polarizing filter having a third transmission axis rotated at a second prescribe angle with respect to the transmission axis of the second filter, the third polarizing filter receptive of the multiplexed image from the first polarizing filter;

a motor for coupled to the second and third polarizing filters for rotating the second and third polarizing filters.

15. An image display system comprising:

a video signal processing unit receptive of stereographic images originating from stereographic image sources at a prescribed frame rate and operative thereby to generate a multiplexed image stream and a series of synchronization pulses;

an image display device receptive of the multiplexed image stream and operative thereby to display the multiplexed image stream as multiplexed images;

a phase-locked loop receptive of the series of synchronization pulses from the signal processing unit; and a optical signal filter system coupled to the phase-locked loop and receptive of the multiplexed images from the image display device;

wherein the optical signal filter system alternately passes or blocks the passages of a first and second segment of the multiplexed images.

16. The image display system as set forth in claim 15 wherein the optical signal filter system comprises:

a first polarizing filter having a first transmission axis, the first polarizing filter receptive of the multiplexed images from the display device and operative thereby to pass the received multiplexed images therethrough;

a second polarizing filter having a second transmission axis rotated at a first prescribe angle with respect to the transmission axis of the first filter, the second polarizing filter receptive of the multiplexed images from the first filter and operative thereby to pass a first segment of the multiplexed images therethrough; and a third polarizing filter having a third transmission axis rotated at a second prescribe angle with respect to the transmission axis of the second filter, the third polarizing filter receptive of the multiplexed images from the first filter and operative thereby to pass a second segment of the multiplexed images therethrough.

17. The image display system as set forth in claim 15 wherein the phase-locked loop comprises:
   a digital signal processing unit receptive of the series of synchronization pulses from the video signal processing unit and operative thereby to provide as output a command signal;
   a controller receptive of the command signal from the digital signal processing unit and operative thereby to provide as output a motor drive signal;
   a motor receptive of the motor drive signal for rotating the optical filter system;
   a sensor coupled to the motor for sensing the rotational velocity of the motor and operative thereby to provide as output a feedback signal directed to the controller and the digital signal processing unit as a set of pulses for synchronization with the series of synchronization pulses.

18. The image display system as set forth in claim 15 further comprising an item of apparel worn by a viewer wherein the signal processing unit, the image display device, the phase-locked loop and the optical signal filter system are integral to the item of apparel.

19. The image display system as set forth in claim 15 further comprising an item of apparel wherein the motor and the optical signal filter system are integral to the item of apparel.

20. The image display system as set forth in claim 18 wherein the item of apparel is a pair of glasses.

21. The image display system as set forth in claim 18 wherein the item of apparel is a head mounted helmet.

22. A display device comprising:
   a display device for displaying multiplexed images;
   a first polarizing filter having a first transmission axis, the first polarizing filter receptive of the multiplexed images from the display device and operative thereby to pass the received multiplexed images therethrough;
   a second polarizing filter having a second transmission axis rotated at a first prescribe angle with respect to the transmission axis of the first filter, the second polarizing filter receptive of the multiplexed images from the first filter and operative thereby to pass the received multiplexed images therethrough; and
   a third polarizing filter having a third transmission axis, the third polarizing filter receptive of the multiplexed images from the first and second polarizing filters and operative thereby to alternately pass a first and a second portion of the multiplexed images therethrough.

23. A display device comprising:
   a display device for displaying multiplexed images;
   a first polarizing filter having a first transmission axis, the first polarizing filter receptive of the multiplexed images from the display device and operative thereby to pass the received multiplexed images therethrough;
   a second polarizing filter having a second transmission axis, the second polarizing filter receptive of the multiplexed images from the first polarizing filter and from the display device and operative thereby to alternately pass first and second portion of the multiplexed images therethrough; and
   a third polarizing filter having a third transmission axis, rotated at a first prescribe angle with respect to the transmission axis of the first polarizing filter, the third polarizing filter receptive of the multiplexed images from the second polarizing filter and operative thereby to pass a third portion of the multiplexed images therethrough.

24. The image display system as set forth in claim 15 wherein the optical signal filter system comprises:
   a first polarizing filter having a first transmission axis, the first polarizing filter receptive of the multiplexed images from the display device and operative thereby to pass the received multiplexed images therethrough;
   a second polarizing filter having a second transmission axis, rotated at a first prescribe angle with respective to the transmission axis of the first filter, the second polarizing filter receptive of the multiplexed images from the display device and operative thereby to pass the received multiplexed images therethrough; and
   a third polarizing filter having a third transmission axis, the third polarizing filter receptive of the multiplexed images from the first and second polarizing filters and operative thereby to alternately pass a first and a second portion of the multiplexed images therethrough.

25. The image display system as set forth in claim 15 wherein the optical signal filter system comprises:
   a first polarizing filter having a first transmission axis, the first polarizing filter receptive of the multiplexed images from the display device and operative thereby to pass the received multiplexed images therethrough;
   a second polarizing filter having a second transmission axis, the second polarizing filter receptive of the multiplexed images from the first polarizing filter and from the display device and operative thereby to alternately pass a first and second portion of the multiplexed images therethrough; and
   a third polarizing filter having a third transmission axis, rotated at a first prescribe angle with respect to the transmission axis of the first polarizing filter, the third polarizing filter receptive of the multiplexed images from the second polarizing filter and operative thereby to pass a third portion of the multiplexed images therethrough.

26. The image display system as set forth in claim 15 further comprising a communications network including at least one stereographic image or data source connected thereto from a remote geographical location and configures to process the stereographic image or data.

27. The display device as set forth in claim 16 wherein the first filter is stationary.

28. The display device as set forth in claim 16 wherein the second and third filter rotate at a prescribed angular velocity with respect to the fist filter.

29. The display device as set forth in claim 16 wherein the first prescribed angle is zero degrees.

30. The display device as set forth in claim 16 wherein the first and second polarizing filters are positioned at right angles with respect to an optical axis passing through the display device.

31. The display device as set forth in claim 16 further comprising a motor coupled to the second and third polarizing filters for rotating the second and third polarizing filters.

32. The display device as set forth in claim 16 wherein the second prescribed angle is ninety degrees.

33. The display device as set forth in claim 28 wherein the second prescribed angular velocity is approximately $120\pi$ radians per sec or greater.

* * * * *